United States Patent
Thomas

(10) Patent No.: US 9,458,889 B2
(45) Date of Patent: Oct. 4, 2016

(54) REVERSE BEARING SYSTEM, APPARATUS, AND METHOD

(71) Applicant: Randall R. Thomas, Fort Worth, TX (US)

(72) Inventor: Randall R. Thomas, Fort Worth, TX (US)

(73) Assignee: Lockheed Martin Corporation, Bethesda, MD (US)

( * ) Notice: Subject to any disclaimer, the term of this patent is extended or adjusted under 35 U.S.C. 154(b) by 0 days.

(21) Appl. No.: 14/627,829

(22) Filed: Feb. 20, 2015

(65) Prior Publication Data

US 2016/0245341 A1  Aug. 25, 2016

(51) Int. Cl.
  *F16C 35/00*  (2006.01)
  *F16C 35/02*  (2006.01)
  *F16B 43/00*  (2006.01)
  *F16C 17/02*  (2006.01)
  *F16C 43/02*  (2006.01)

(52) U.S. Cl.
  CPC .............. *F16C 35/02* (2013.01); *F16B 43/003* (2013.01); *F16C 17/02* (2013.01); *F16C 43/02* (2013.01)

(58) Field of Classification Search
  CPC .... F16C 11/0695; F16C 17/02; F16C 17/10; F16C 17/105; F16C 17/12; F16C 23/043; F16C 23/045; F16C 35/02; F16C 35/06; F16C 35/067; F16C 43/02; F16B 39/02; F16B 39/04; F16B 39/10; F16B 39/108; F16B 43/003
  USPC ................................ 411/122, 197, 201, 323
  See application file for complete search history.

(56) References Cited

U.S. PATENT DOCUMENTS

| | | | | |
|---|---|---|---|---|
| 762,243 | A * | 6/1904 | Morrow | F16B 39/04 411/212 |
| 1,552,681 | A * | 9/1925 | Davis | F16B 39/10 411/204 |
| 2,887,891 | A * | 5/1959 | Perez | F16B 39/108 411/123 |
| 3,516,136 | A | 6/1970 | Carter et al. | |
| 3,934,957 | A | 1/1976 | Derner | |

(Continued)

FOREIGN PATENT DOCUMENTS

FR     741259    * 2/1933

OTHER PUBLICATIONS

Translation of FR 741259 obtained Mar. 24, 2016.*

*Primary Examiner* — James Pilkington
(74) *Attorney, Agent, or Firm* — Baker Botts L.L.P.

(57) ABSTRACT

A bearing system includes a bearing comprising a first end and a second end opposite to the first end. The bearing further comprises a plurality of threads adjacent to the second end. The plurality of threads comprise a first slot perpendicular to the plurality of threads. The bearing system also includes a washer comprising a first surface adjacent to the second end of the bearing and a plane parallel to the first surface. The washer further comprises a plurality of side tabs extending from a second surface in a direction parallel to the plane and a first tab extending from the first surface in a direction perpendicular to the plane. The first tab mates with the first slot of the bearing. The bearing system further comprises a nut positioned between the first end of the bearing and the first surface of the washer.

5 Claims, 6 Drawing Sheets

(56) References Cited

U.S. PATENT DOCUMENTS

| | | |
|---|---|---|
| 4,076,343 A | 2/1978 | McCloskey |
| 4,319,788 A | 3/1982 | Hackman |
| 4,614,444 A | 9/1986 | Hines et al. |
| 4,662,772 A | 5/1987 | Schultz |
| 5,007,746 A | 4/1991 | Matzelle et al. |
| 5,618,143 A * | 4/1997 | Cronin, II ............. F16C 35/063 411/120 |
| 6,612,744 B2 | 9/2003 | Sasaki et al. |
| 8,562,237 B2 * | 10/2013 | Pina Lopez ............. F16C 35/02 384/206 |
| 8,585,291 B2 | 11/2013 | Bridgewater |
| 2008/0040886 A1 | 2/2008 | Arnold et al. |

* cited by examiner

REVERSE BEARING SYSTEM, APPARATUS, AND METHOD

GOVERNMENT INTEREST

This invention was made with government support under contract number N00019-02-C-3002 awarded by the Department of the Navy. The government may have certain rights in the invention.

TECHNICAL FIELD

This disclosure generally relates to bearings, and more particularly to a reverse bearing system, apparatus, and method.

BACKGROUND

Bearing systems may be used in confined spaces of an object. However, those bearing systems often use configurations that waste valuable space and reduce the life of the systems.

BRIEF DESCRIPTION OF THE DRAWINGS

For a more complete understanding of the present disclosure and for further features and advantages thereof, reference is now made to the following description taken in conjunction with the accompanying drawings, in which.

DETAILED DESCRIPTION

Bearing systems are often used in confined spaces. For example, a bearing system may be used in a small hole of an interior portion of an aircraft. As another example, a bearing may be used in a small hole of a boat. In such small spaces, bearing systems that position a washer between a bearing and a nut require too much space and reduce the number of threads that secure the nut to the bearing. As a result of the reduced threading, the bearing may fail at high loads.

Accordingly, aspects of the present disclosure include a bearing system that, in one embodiment, includes a bearing that has a first end and a second end opposite to the first end. The bearing further includes a plurality of threads adjacent to the second end. The plurality of threads include a first slot perpendicular to the plurality of threads. The bearing system also includes a washer that has a first surface adjacent to the second end of the bearing and a plane parallel to the first surface. The washer further includes a plurality of side tabs extending from a second surface in a direction parallel to the plane and a first tab extending from the first surface in a direction perpendicular to the plane. The first tab mates with the first slot of the bearing. The bearing system further includes a nut positioned between the first end of the bearing and the first surface of the washer.

The bearing system of the present disclosure may provide numerous advantages. For example, positioning the nut between the bearing and the washer reduces the overall profile of the bearing system thereby allowing it to fit within a confined space. As another example, the additional space may result in a greater number of threads that secure the bearing to the nut thereby increasing the thread strength of the bearing system. As a result of the increased thread strength, the bearing system may withstand higher loads. Additionally, the life of the bearing may be prolonged.

Figure 1:
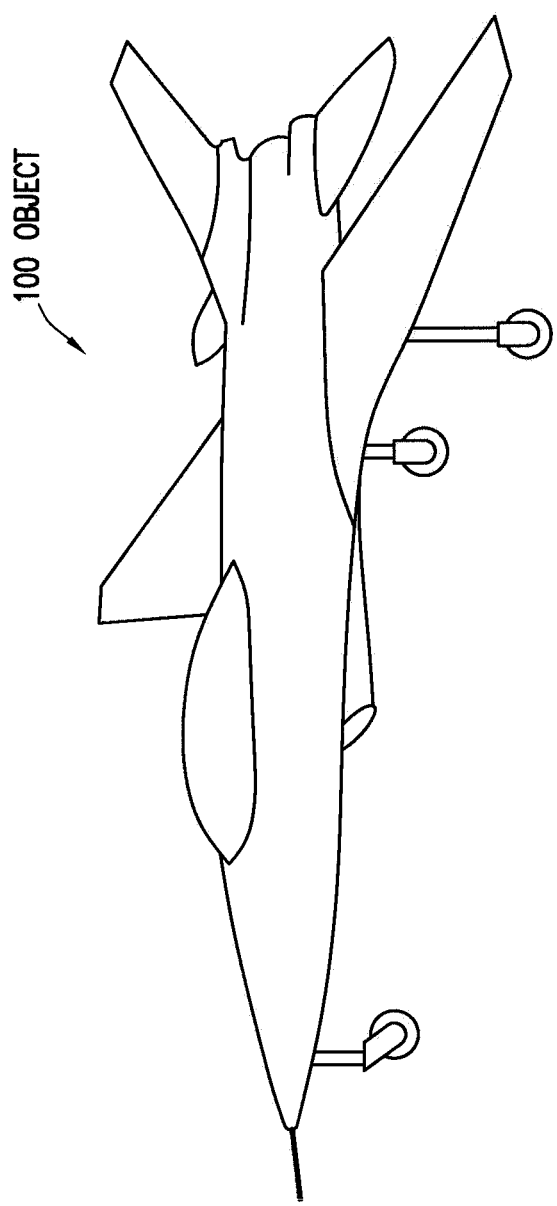
FIG. 1 is a diagram illustrating an example object, according to certain embodiments of the present disclosure.
Figure 2:
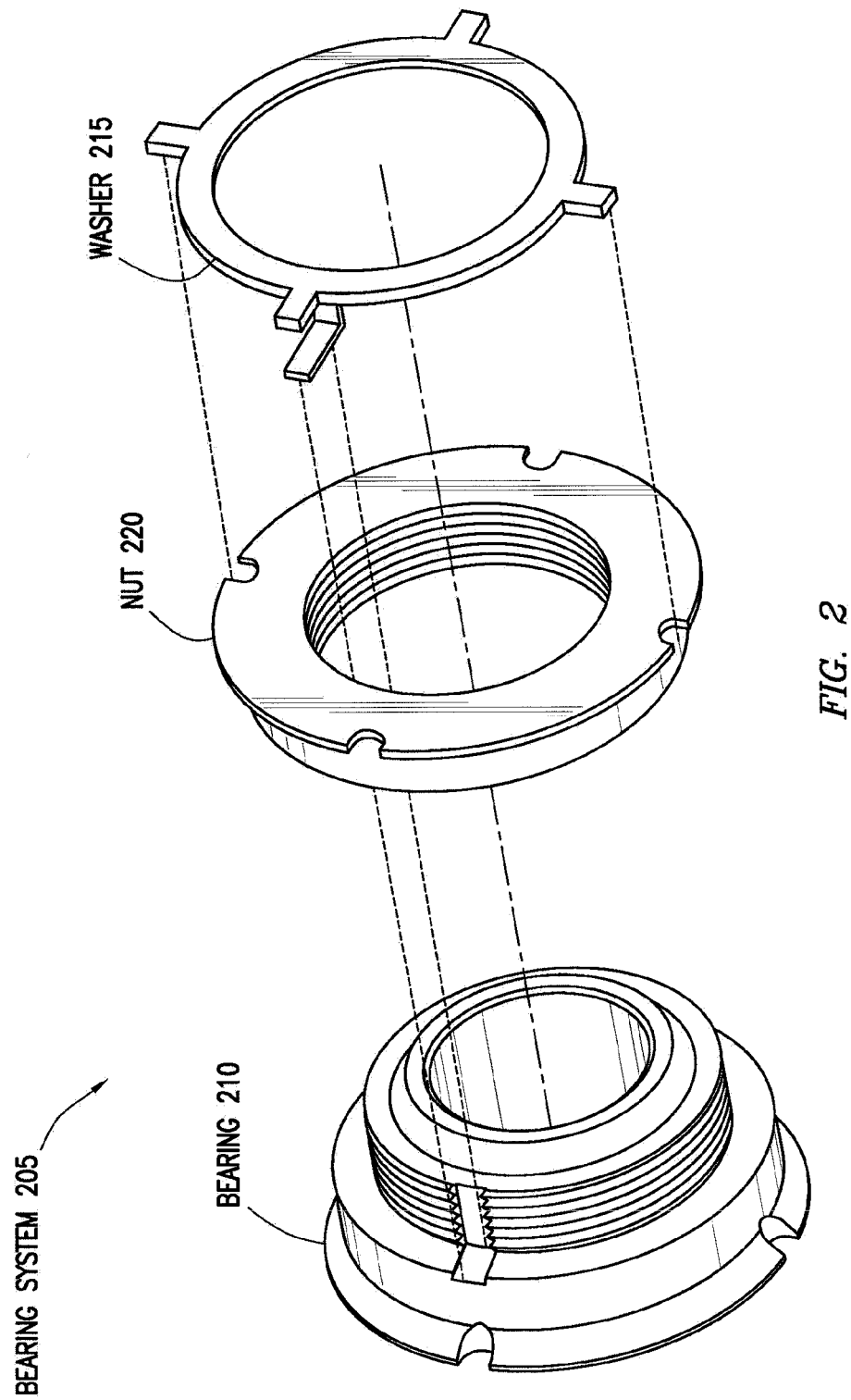
FIG. 2 is a diagram illustrating an example bearing system used in the object of FIG. 1, according to certain embodiments of the present disclosure.
Figure 3:
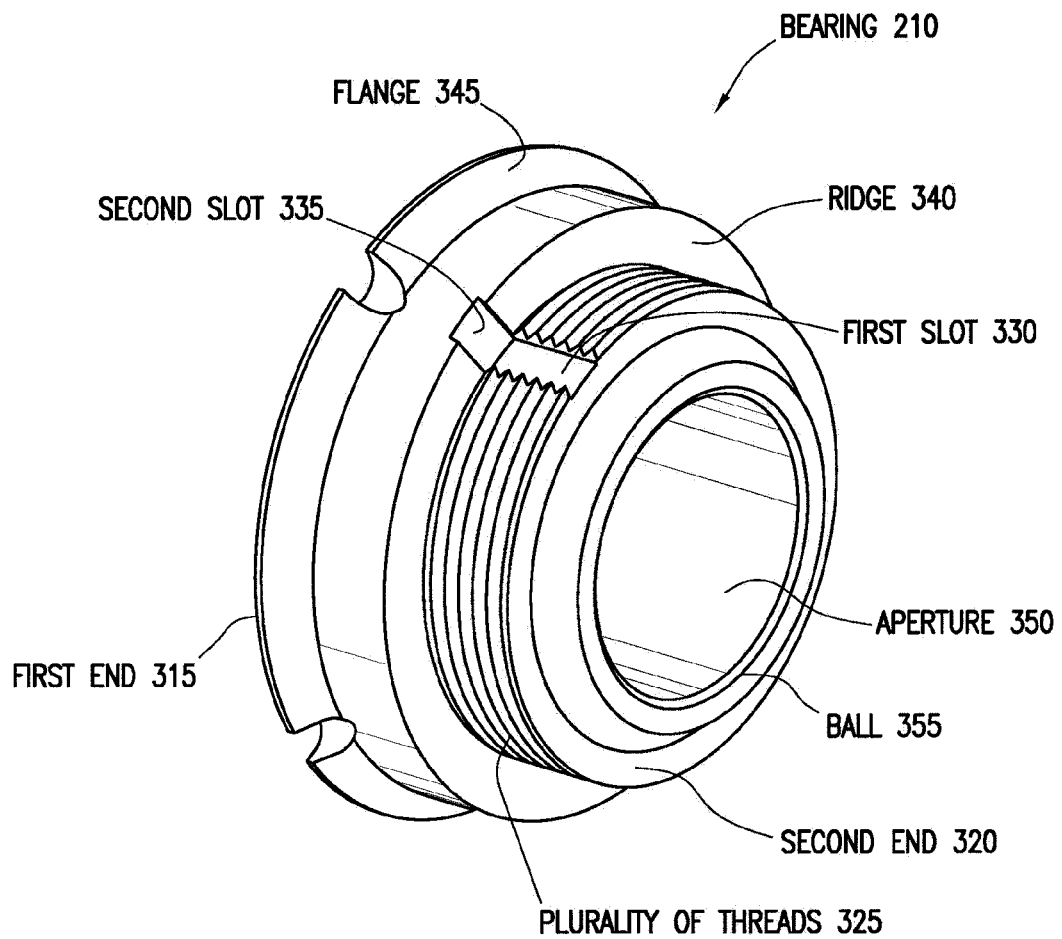
FIG. 3 is a diagram illustrating an example bearing used in the bearing system of FIG. 2, according to certain embodiments of the present disclosure.
Figure 4:
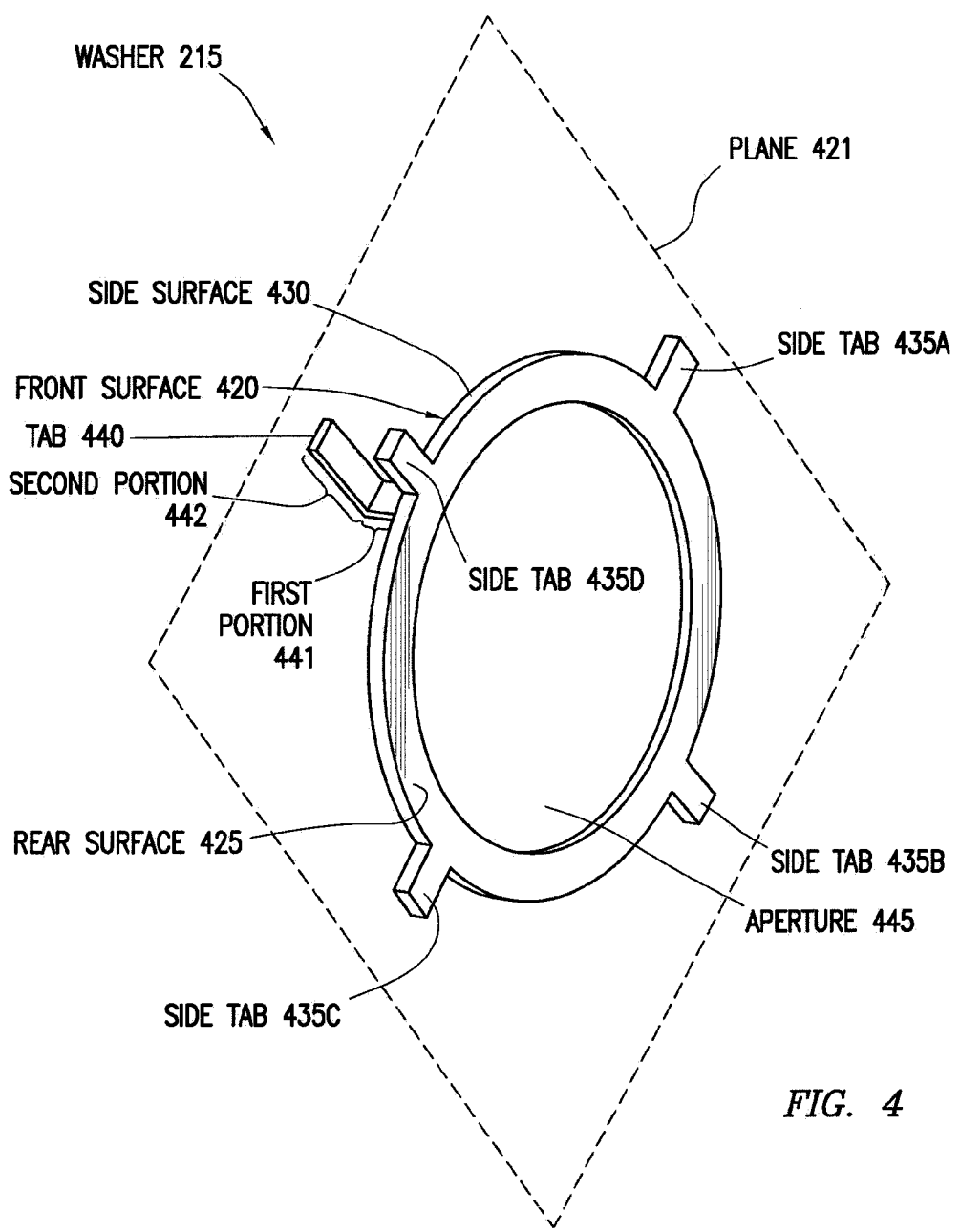
FIG. 4 is a diagram illustrating an example washer used in the bearing system of FIG. 2, according to certain embodiments of the present disclosure.
Figure 5:
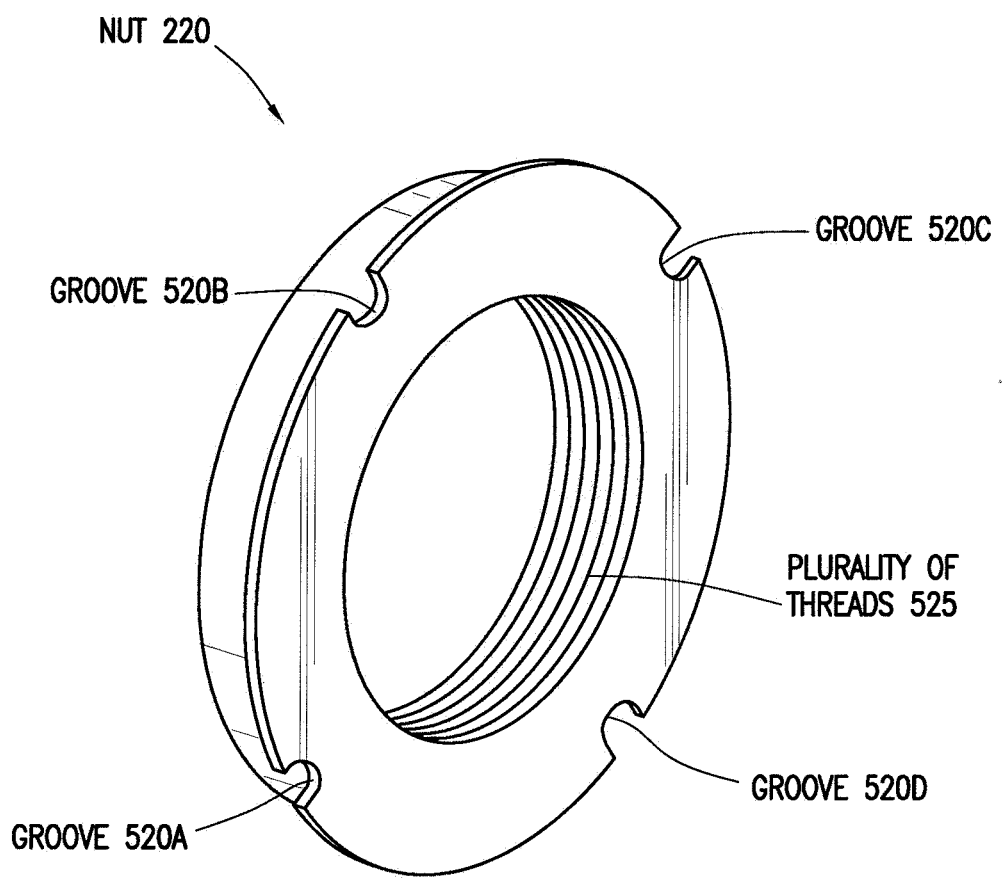
FIG. 5 is a diagram illustrating an example nut used in the bearing system of FIG. 2, according to certain embodiments of the present disclosure.
Figure 6:
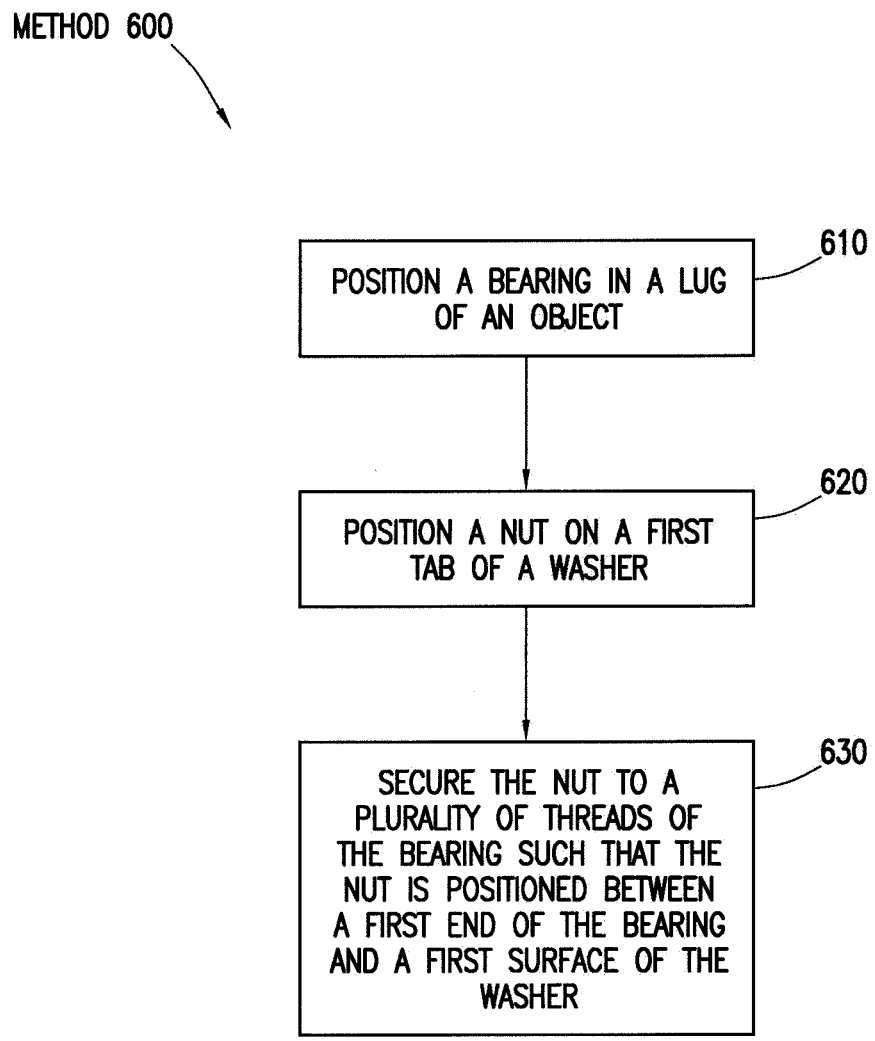
FIG. 6 is a flow chart illustrating an example method for assembling the bearing system of FIG. 2, according to certain embodiments of the present disclosure.

Additional details are discussed in FIGS. 1 through 6. FIG. 1 illustrates an example object 100, and FIG. 2 shows an example bearing system 205 that may be used in object 100 of FIG. 1. FIGS. 3 through 5 respectively show an example bearing 210, an example washer 215, and an example nut 220 that may be used in bearing system 205 of FIG. 2. FIG. 6 shows an example method of assembling bearing system 205 in object 100.

FIG. 1 is a diagram illustrating an example object 100, according to certain embodiments of the present disclosure. Example object 100 may be any type of object that uses bearings. For example, object 100 may be an aircraft, a helicopter, a boat, or a vehicle (e.g., a car). Object 100 may include a confined space in which a bearing system is inserted through a lug. For example, an aircraft's landing gear may have a lug through which a bearing system may be inserted. Due to the confined space in object 100, properly positioning the components of the bearing system may result in significant space savings, increase the amount of load that the bearing system can handle, and prolong the life of the bearing system.

FIG. 2 is a diagram illustrating an example bearing system 205 used in object 100 of FIG. 1, according to certain embodiments of the present disclosure. Bearing system 205 may align parts within a lug of object 100 in an embodiment. For example, bearing system 205 may align an aircraft's landing gear in a lug. Bearing system 205 may include bearing 210, washer 215, and nut 220 in an embodiment.

As noted above, properly positioning the components of bearing system 205 may provide substantial advantages over prior bearing systems. Bearing 210 may be positioned in a lug of object 100 in an embodiment. Nut 220 may be positioned on washer 215 in an embodiment. For example, a portion of nut 220 may be positioned on a portion of washer 215. In that example, the portion of washer 215 may be tab 440. Once nut 220 is positioned on a portion of washer 215, washer 215 and nut 220 may then be secured to bearing 210 such that the nut 220 is positioned between bearing 210 and washer 215. For example, washer 215 and nut 220 may be secured to bearing 210 by screwing nut 220 to bearing 210. Positioning nut 220 between bearing 210 and washer 215 permits significant space savings and increases the number of threads on bearing 210 that mate with nut 220. As a result, thread strength is increased such that bearing system 205 may withstand higher loads and the life of bearing 210 may be increased.

FIG. 3 is a diagram illustrating an example bearing 210 used in bearing system 205 of FIG. 2, according to certain embodiments of the present disclosure. In some embodiments, bearing 210 may be a captor bearing. In that embodiment, bearing 210 may be retained in a lug through threading rather than material deformation. Bearing 210 may be used to align parts in a lug. For example, bearing 210 may align landing gear of an aircraft in a lug. Bearing 210 may be coated with an anti-friction coating on an interior surface. For example, bearing 210 may be coated with grease, dry film lubrication, polytetrafluoroethylene, or any other anti-friction coating. Bearing 210 may include first end 315, second end 320, plurality of threads 325, first slot 330, second slot 335, ridge 340, flange 345, aperture 350, and ball 355 in certain embodiments.

First end 315 may be an end of bearing 210 in an embodiment. First end 315 may have a diameter greater than a diameter of second end 320 in an embodiment. First end 315 may be positioned on a portion of a lug in an embodiment. For example, first end 315 may be positioned on an exterior of a lug. First end 315 may be positioned opposite to second end 320 in an embodiment.

Second end 320 may be an end of bearing 210 in an embodiment. Second end 320 may have a diameter that is less than a diameter of first end 315 in an embodiment. Second end 320 may be positioned through or within a lug in an embodiment. Second end 320 may be positioned opposite to first end 315 in some embodiments. Additionally, second end 320 may be positioned adjacent to plurality of threads 325 in some embodiments.

Plurality of threads 325 may be any type of thread operable to secure bearing 210 to nut 220 in an embodiment. Threads 325 may mate with threads 525 of nut 220 in an embodiment. Although FIG. 3 shows bearing 210 having six threads, any number of threads 325 may be used. For example, seven threads may be used. Threads 325 may be positioned adjacent to second end 320 in certain embodiments. Plurality of threads 325 may extend from second end 320 to ridge 340 in certain embodiments. Threads 325 may substantially surround an outer perimeter of bearing 210 in certain embodiments. Threads 325 may have first slot 330 through at least a portion of threads 325 in an embodiment.

First slot 330 may be any type of slot, groove, notch, or channel that is operable to mate with tab 440 of washer 215 in an embodiment. As noted above, mating first slot 330 with tab 440 may prevent washer 215 from falling off of bearing system 205. First slot 330 may be positioned perpendicularly to threads 325 in an embodiment. First slot 330 may be positioned below a surface of threads 325 in an embodiment. Positioning first slot 330 below threads 325 may ensure that tab 440 of washer 215 does not interfere with threads 325 mating with threads 525 of nut 220. First slot 330 may be machined into bearing 210 in certain embodiments. Although only illustrated as having a single first slot 330, bearing 210 may have multiple slots spaced around the perimeter of threads 325 in an embodiment. In some embodiments, first slot 330 may extend partially through threads 325. For example, first slot 330 may extend through three of seven threads. In other embodiments, first slot 330 may extend through each of threads 325. In that example, first slot 330 may extend until it meets second slot 335 at ridge 340.

Second slot 335 may be any type of slot, groove, notch, or channel that is operable to mate with tab 440 of washer 215 in an embodiment. Mating second slot 335 with tab 440 may prevent washer 215 from falling off of bearing system 205. Second slot 335 may be positioned in a plane perpendicular to a plane of first slot 330 in some embodiments. Second slot 335 may be machined into ridge 340 in certain embodiments. Although only illustrated as a single second slot 335, bearing 210 may have multiple slots in ridge 340.

Ridge 340 may be a portion of bearing 210 without threading. Ridge 340 may have a diameter greater than the diameter of second end 320 in certain embodiments. Ridge 340 may be positioned adjacent to threads 325 in an embodiment. In certain embodiments, ridge 340 may be positioned between threads 325 and first end 315. Ridge 340 may extend from threads 325 to flange 345 in an embodiment.

Flange 345 may be any type of flange operable to facilitate securing bearing 210 to a lug of object 100 in certain embodiments. Flange 345 may prevent bearing 210 from falling through a lug of object 100 in an embodiment by having a diameter larger than the diameter of the lug. Flange 345 may be positioned at first end 315 in an embodiment.

Aperture 350 may be any hole, lug, or opening in an embodiment. Aperture 350 may extend through bearing 210 in an embodiment. For example, aperture 350 may extend from first end 315 to second end 320. Aperture 350 may be any size suitable to align a component that extends through aperture 350 in some embodiments. For example, aperture 350 may be sized to align a landing gear component of object 100 that extends through aperture 350. In that example, aperture 350 may align landing gear such that the landing gear does not become misaligned under extreme loading.

Ball 355 may be any type of ball operable to align a component of object 100 in an embodiment. For example, when object 100 is an aircraft with landing gear, ball 355 may facilitate the alignment of the landing gear in certain embodiments. Ball 355 may be secured to bearing 210 in any manner. For example, ball 355 may be secured to bearing 210 using a friction fit. Ball 355 may be positioned within aperture 350 of bearing 210 in some embodiments. Ball 355 may be made of any material. For example, ball 355 may be a metal. Ball 355 may be sized to mate with bearing 210. Ball 355 may be coated with an anti-friction coating in some embodiments. For example, an interior surface of ball 355 may be coated with grease, a dry film lubrication, polytetrafluorethylene, or any other anti-friction coating. In some embodiments, an outer surface of ball 355 may be coated with an anti-friction coating. Ball 355 may have an anti-friction coating on an outer surface of ball 355 in certain embodiments. Anti-friction coating on an outer surface of ball 355 may be in addition to or in lieu of anti-friction coating on an inner surface of bearing 210 in embodiments.

FIG. 4 is a diagram illustrating an example washer 215 used in bearing system 205 of FIG. 2, according to certain embodiments of the present disclosure. Washer 215 may prevent nut 220 from unscrewing from bearing 210 in certain embodiments. Washer 215 may include front surface 420, plane 421, rear surface 425, side surface 430, side tabs 435A-435D, tab 440, and aperture 445 in an embodiment.

Front surface 420 may be a surface of washer 215 that is positioned adjacent to nut 220 in certain embodiments. Front surface 420 may be positioned opposite to rear surface 425 in an embodiment. Front surface 420 may be made of any type of material, such as a metal or a plastic.

Plane 421 may be a plane on front surface 420 in an embodiment. Plane 421 may be parallel to front surface 420 in some embodiments.

Rear surface 425 may be a surface of washer 215 that is positioned opposite to front surface 420 in an embodiment. Rear surface 425 may be made of any type of material, such as a metal or plastic. Rear surface 425 may be interconnected with front surface 420 by side surface 430 in an embodiment.

Side surface 430 may be a surface of washer 215 that is positioned between front surface 420 and rear surface 425 in certain embodiments. Side surface 430 may be made of any type of material, such as a metal or a plastic. In some embodiments, side surface 430 may have side tabs 435A-435D extending from side surface 430.

Side tabs 435A-435D may be multiple protrusions extending from side surface 430 in certain embodiments. Tabs 435A-435D may secure washer 215 to nut 220 in some embodiments. For example, side tabs 435A-435D may be bent such that each of side tabs 435A-435D mate with one of grooves 520A-520D of nut 220. Side tabs 435A-435D may extend from side surface 430 in a direction parallel to plane 421 in some embodiments. Although FIG. 4 illustrates side tabs 435A-435D as including four separate tabs, side tabs 435A-435D may include any number of tabs. For example, side tabs 435A-435D may include two tabs. Side tabs 435A-435D may be made of any material, such as a metal or a plastic. Side tabs 435A-435D may be deformable such that each of side tabs 435A-435D may be bent into one of grooves 520A-520D of nut 220 in an embodiment.

Tab 440 may be a protrusion that extends from front surface 420 in an embodiment. Tab 440 may prevent washer 215 from rotating out of bearing 210. Tab 440 may have first portion 441 that extends from front surface 420 in a direction perpendicular to plane 421 in some embodiments. Tab 440 may have second portion 442 that extends from first portion 441 and that is parallel to plane 421 in some embodiments. First portion 441 of tab 440 may be configured to mate with first slot 330 of bearing 210 in some embodiments. Second portion 442 of tab 440 may mate with second slot 335 of bearing 210.

Aperture 445 may be any type of hole or opening in some embodiments. Aperture 445 may be sized such that it does not interfere with any component that goes through bearing 210. Aperture 445 may be any shape. For example, aperture 445 may be circular.

FIG. 5 is a diagram illustrating an example nut 220 used in bearing system 205 of FIG. 2, according to certain embodiments of the present disclosure. Nut 220 may be any type of nut operable to secure bearing 210 in a lug of object 100 in an embodiment. Additionally, nut 220 may be any type of nut operable to secure washer 215 to bearing 210 in an embodiment. Nut 220 may be positioned on a portion of washer 215 and secured to bearing 210 using plurality of threads 525 as described below. Additionally, nut 220 may be positioned between bearing 210 and washer 215. Nut 220 may include grooves 520A-520D and threads 525 in certain embodiments.

Grooves 520A-520D may each be any type of groove, notch, or slot that is operable to mate with one of side tabs 435A-435D of washer 215 in an embodiment. When grooves 520A-520D are each mated with one of side tabs 435A-435D, grooves 520A-520D may secure washer 215 to bearing 210 in an embodiment. Grooves 520A-520D may be machined into nut 220 in certain embodiments. Grooves 520A-520D may extend only partially through nut 220 in certain embodiments. In other embodiments, grooves 520A-520D may extend through nut 215.

Threads 525 may be any type of thread operable to mate with threads 325 of bearing 210 in an embodiment. Threads 525 may secure nut 220 to bearing 210 in an embodiment. Threads 525 may be machined on an inner surface of nut 220 in certain embodiments. Threads 525 may include any number of threads. For example, threads 525 may include seven threads.

FIG. 6 is a flow chart illustrating an example method 600 of assembling bearing system 205 of FIG. 2, according to certain embodiments of the present disclosure. Method 600 begins at step 610, where bearing 210 is positioned in a lug of object 100. For example, bearing 210 may be positioned in a lug of an aircraft's landing gear. Once bearing 210 is positioned inside the lug of object 100, method 600 proceeds to step 620.

At step 620, nut 220 is positioned on a portion of tab 440 of washer 215. For example, nut 220 may be positioned on first portion 441 of tab 440. In that example, nut 220 may also be positioned against second portion 442. Once nut 220 is positioned on a portion of tab 440, method 600 proceeds to step 630.

At step 630, nut 220 is secured to threads 325 of bearing 210 such that nut 220 is positioned between first end 315 of bearing 210 and front surface 420 of washer 215. For example, nut 220 may be secured to threads 325 of bearing 210 using threads 525 of nut 220.

As an example embodiment of operation, bearing 210 may be positioned in a lug of an aircraft landing gear. Nut 220 may be positioned on tab 440 of washer 215. Tab 440 of washer 215 may be aligned with first slot 330 and second slot 335 of bearing 210. Nut 220 may be secured to bearing 210 by mating threads 325 of bearing 210 to threads 525 of nut 220. Additionally, each of side tabs 435A-435D of washer 215 may be aligned with one of grooves 520A-520D of nut 220. Once side tabs 435A-435D are aligned, each of side tabs 435A-435D may be bent into one of grooves 520A-520D. By bending each of side tabs 435A-435D into one of grooves 520A-520D, washer 215 is secured to bearing 210.

Bearing system 205 may provide numerous advantages. For example, positioning nut 220 between bearing 210 and washer 215 may reduce the overall profile of bearing system 205 thereby allowing it to fit within a confined space. As another example, the additional space may result in a greater number of threads 325 that secure bearing 210 to nut 215 thereby increasing the thread strength of bearing system 205. As a result of the increased thread strength, bearing system 205 can withstand high loads. Additionally, the life of bearing 210 may be prolonged.

Although the present disclosure has been described with several embodiments, a myriad of changes, variations, alterations, transformations, and modifications may be suggested to one skilled in the art, and it is intended that the present disclosure encompass such changes, variations, alterations, transformations, and modifications.

What is claimed is:

1. A bearing system, comprising:
a bearing comprising a first end and a second end opposite to the first end, the bearing comprising a plurality of threads adjacent to the second end, the plurality of threads comprising a first slot perpendicular to the plurality of threads, wherein the bearing comprises a ridge positioned between the first end and the second end, the ridge adjacent to the plurality of threads and comprising a second slot perpendicular to the first slot;
a washer comprising:
a first surface adjacent to the second end of the bearing and defining a plane parallel to the first surface;
a plurality of side tabs extending from a second surface in a direction parallel to the plane; and
a first tab, the first tab including a first portion extending from the first surface in a direction perpendicular to the plane, the first portion mating with the first slot of the bearing, the first tab including a second portion extending in a direction perpendicular to the first portion, the second portion mating with the second slot of the bearing; and a nut positioned between the first end of the bearing and the first surface of the washer, wherein the nut comprises a plurality of grooves that each mate with one of the plurality of side tabs of the washer, wherein each of the plurality of side tabs of the washer are operable to bend into one of the plurality of grooves of the nut.

2. The bearing system of claim 1, wherein the first slot extends through each of the plurality of threads.

3. The bearing system of claim 1, wherein the first portion of the washer is positioned below each of the plurality of threads of the bearing.

4. The bearing system of claim 1, wherein the washer comprises a metal.

5. A method of mounting a bearing system, comprising:
   positioning a bearing in a lug of an object, the bearing comprising a first end and a second end opposite to the first end, the bearing comprising a plurality of threads adjacent to the second end, the plurality of threads comprising a first slot perpendicular to the plurality of threads, the bearing comprising a ridge positioned between the first end and the second end, the ridge adjacent to the plurality of threads and comprising a second slot perpendicular to the first slot, the second slot configured to mate with a tab of a washer;
   positioning a nut on a first tab of the washer, the washer further comprising:
      a first surface defining a plane parallel to the first surface and a second surface opposite to the first surface;
      a plurality of side tabs extending from the second surface in a direction parallel to the plane, wherein the first tab extends from the first surface in a direction perpendicular to the plane; and
      a second tab extending from the first tab in a direction perpendicular to the first tab, the second tab mating with the second slot of the bearing;
   securing the nut to the plurality of threads of the bearing such that the nut is positioned between the first end of the bearing and the first surface of the washer, the first surface of the washer is positioned adjacent to the second end of the bearing, and the first tab of the washer mates with the first slot of the bearing;
   aligning each of the plurality of side tabs of the washer with one of a plurality of grooves of the nut; and
   bending each of the plurality of side tabs into one of the plurality of grooves.

* * * * *